United States Patent Office 2,913,347
Patented Nov. 17, 1959

2,913,347

PROTEINACEOUS PREPARATIONS

Theodor Wilhelm Pfirrmann, Ludwigshafen (Rhine), Germany, assignor to Badische Anilin- & Soda-Fabrik Aktiengesellschaft, Ludwigshafen (Rhine), Germany No Drawing. Application March 17, 1955
Serial No. 495,033

Claims priority application Germany March 18, 1954

13 Claims. (Cl. 106—135)

This invention relates to improved proteinaceous preparations and to a process for manufacturing such preparations. More particularly it is directed to proteinaceous compositions containing one or several additional substances which improve the stability and the binding power of the protein.

In the production of aqueous preparations, as for example aqueous solutions, pastes or powders which contain proteins, such as gelatin, casein and the like, difficulties are encountered because upon storage, by reason of chemical influences, unfavourable weather or the action of microorganisms, they change in an uncontrollable fashion, become liquid or unhomogeneous or thicken, gelatinise or clot. The protein loses binding power. Films, threads and the like prepared therefrom lose strength and may no longer be hardened sufficiently. It is therefore usual to add to the protein preparations, substances which inhibit these changes, as for example wetting agents, softeners or substances having bactericidal and/or fungicidal action. In spite of such additions, however, the protein preparations hitherto known have only limited stability. The poor stability is especially noticeable in the case of proteinaceous preparations which are to be used as coloured impregnating agents, lacquers, coatings or films. The dyestuffs incorporated in solution or as pigments very often aggravate the detrimental action of the said influences so that the utilisation value of the dyestuff-containing preparations falls off even more rapidly.

Among the principal objects of the present invention are provisions relating to improved proteinaceous preparations.

A more particular object of the invention are preparations of a protein and an additional substance which is compatible with proteins and which improves the stability of proteins against decomposition and increases the binding power of the proteins for pigments and other substances.

Another object of the invention are colored preparations of a protein, an additional protein-compatible substance and a pigment and/or a soluble dyestuff.

A further object of the invention are lacquers, paints and shaped articles containing the aforementioned compositions.

A still further object of the invention is a process for the production of stable aqueous preparations of a protein and a protein-compatible additional substance.

These and still further objects which will be apparent from the more detailed description of the invention may be accomplished as follows:

In accordance with this invention I have found that proteinaceous preparations which do not exhibit the said drawback are obtained by incorporating with the solutions, pastes or powders containing the protein, a water-soluble substance which contains in the molecule one or more >C=O groups derived from an acid group, i.e. free carboxylic acid groups or salts or other derivatives of carboxylic acids, and also one or more >NH groups, such as amino, imino, amido or imido groups and which is not itself a protein.

Among additional substances of the said kind there may be mentioned for example lactams, as for example pyrrolidones-2, caprolactam, propionic acid lactam, caprylic acid lactam, aminolactones, amino carboxylic acids and their hydroxy compounds, also the salts of aminocarboxylic acids f.i. with diamines or saturated and unsaturated dicarboxylic acids, the salts of bifunctional and polyfunctional amines and saturated and unsaturated carboxylic acids, as for example, from hexamethylene diamine or ethylene diamine on the one hand and malonic acid, maleic acid, adipic acid or succinic acid on the other hand, also mono- and poly-functional acid amides and acid imides, as for example acetamide, succinimide, phthalimide or urethanes and mixtures of these substances. These can be partly substituted on the nitrogen atom or by an organic radical so that a hydrogen atom still remains on the nitrogen atom. Of particular interest are proteinaceous preparations according to this invention containing polyamide forming substances. The term "polyamide forming substance" includes all the known substances, such as lactams, aminocarboxylic acids and mixtures or salts of diamines and dicarboxylic acids which form according to known methods film forming polyamides.

The amount of the protein and of the additional substance containing the groups >C=O and >NH may be varied within wide limits. As far as dry, powdery mixtures are concerned, they should contain preferably from 2 to 8 parts of the additional substance for 10 parts of the protein.

The aqueous preparations should advantageously contain between 3% and 40% of protein and between 2% and 30% of the additional substance, the content of these substances being referred to the total weight of the preparation. Additional compounds which only have one carbon atom in the molecule should preferably not be added in large amounts for the said purpose. Consequently urea or formamide should not be used in amounts of more than 50% with reference to protein or together with higher molecular weight compounds containing >C=O and >NH groups, as for example with caprolactam or mono- or di-urethanes for example of butane diol or salts of bifunctional amines and carboxylic acids.

Among the proteins suitable for the preparations according to this invention there may be mentioned casein, gelatin, zein, soya bean protein, peanut protein, hide glue and any other animal or vegetable proteins which are soluble or at least swellable in water at room temperature.

By suitably choosing the additional substances or mixtures of the same and by heating the preparation to a temperature up to 100° C., the properties of the proteinaceous preparations can be varied within wide limits. Lactams, as for example caprolactam or butanediol urethanes, have an extremely good water-solubilising action. Even an addition of 5% to a 15% aqueous casein solution or 10% gelatin solution immediately effects a marked liquefaction of the protein solution. The solution becomes clear rapidly when heated to about 40° to 90° C. and the viscosity of the solution is only about one tenth of that of the original solution under comparable conditions. The said and similar substances, and also normal and methylated acid amides, as for example methyl formamide, can be used to prepare high percentage, strongly thread-forming protein solutions, as for example casein solutions, which are still capable of being cast. The said substances act at the same time as softeners. By heating these protein solutions for several hours, preferably from 3 to 15 hours, to about 30° to 90° C., the stability of the same is further improved.

With increasing molecular weight the solubility-improving influence of the additional substances gradually subsides, as for example with the salts of ethylene, propylene or hexamethylene diamine and adipic or glutaric acid and a solidifying action on the threads or films prepared from the solutions becomes more prominent. In this way threads or films can be obtained which are fast to ironing up to 200° C.

The substances to be used as additions, as for example the acid amides and imides, lactams, aminolactones, urethanes and the salts of polycarboxylic acids and polyamines in many cases have more or less pronounced bactericidal and fungicidal properties; some also have tanning properties. Some of the additions reduce somewhat the reactivity of the preparations with tanning and hardening agents. This is especially advantageous when it is desired to manufacture pressed articles or other shaped articles. The hardening agent can be incorporated into the preparation without any danger of the hardening being initiated prematurely. At a sufficiently high temperature, which is non-injurious for the preparations, completely hardened articles are then obtained. This process is also possible in the case of films and lacquers of these preparations, the hardening agent being added to the diluted solutions. The operation of subsequently spraying on the hardening agent is thus rendered unnecessary.

From the following table it may be seen for example how the viscosity of a protein solution (solution I) prepared in the manner hitherto conventional, changes during storage over several months and how the solution can be stabilised by an addition of only 5% of caprolactam to the same solution instead of the same amount of water (solution II). The viscosity is measured in a Ford beaker of 4 mm. nozzle opening at about 20° C.

TABLE

| Time | Solution I: viscosity of the normal about 15% solution in seconds | Solution II: viscosity of the same solution containing 5% of caprolactam in seconds |
| --- | --- | --- |
| On the day of preparation | 1,560 | 153 |
| After 10 days | 1,235 | 136 |
| After 30 days | 1,446 | 135 |
| After 60 days | 2,005 | 138 |
| After 90 days | 3,180 | 133 |

Instead of caprolactam, formamide may be used giving similar results.

The end viscosity is usually set up immediately if the solution has been previously after-condensed for several hours at 30° to 90° C. The changes in viscosity can be recognized from the threads leaving the viscosimeter nozzle. The normal solution no longer gives coherent threads after 15 days but begins to break into irregular pieces. This behaviour becomes worse with a longer period of storage; the protein is in a state of degradation or begins to gelatinize. The addition of 5% of caprolactam not only reduces the viscosity to less than one tenth, but permits it to be kept practically constant throughout the whole period of observation. The solution continually runs out quite uniformly in a thin thread. Inorganic or organic pigments or soluble dyestuffs may be incorporated considerably more easily with the mobile solutions.

The constant result of the binding agent has an extremely favorable effect on the preparation of dyestuff pastes, foils, films, and threads. The properties of the final products are also usually influenced very favorably by the presence of the addition substances. Only the low molecular weight additional substances volatilize somewhat during the evaporation of the water used as solvent. Most additional substances are retained in the film or thread and after hardening with aldehyde are constituents thereof in so far as they are not washed out again after the hardening, which is possible with the lower members having one carbon atom. They cause a clearer, brighter drying out; softeners, as for example butinediol or other polyalcohols of saturated or unsaturated nature can also be condensed in.

Especially advantageous proteinaceous preparations which are suitable for the production of foils, films, and threads are obtained by incorporating with the mixtures above described plastic dispersions. The articles prepared therewith are preferably subjected to a heat treatment. The additional substances of higher molecular weight, in particular lactams, urethanes, and the salts of polycarboxylic acids and polyamines, render the film stronger and also increase its heat resistance, which is of great importance for example for fastness to ironing.

Many of the said substances can be more or less extensively condensed in, or built into, the protein complex by a hardening with aldehydes and a heat after-treatment of the finished products. Among these there may be mentioned for example the lactams, the salts of polyfunctional acids, hydroxyacids, amino acids, and polyfunctional amines, as for example the salt of adipic acid and hexamethylene diamine, mono- or bi-functional urethanes. For example 2 to 10% of such a substance are added to the protein solution, the solution is heated for several hours at temperatures below 100° C. and the threads or films prepared therefrom are heated, after the evaporation of the water and hardening with aldehydes, for some hours to 60° C. to above 100° C. or for several days at 40° to 100° C. The heat resistance becomes increasingly better with increasing duration of the heat treatment and can be brought to more than 200° C. At higher temperatures it is preferable to work under pressure and with a protective gas, such as nitrogen or hydrogen, to avoid oxidation.

If the additional substances are liquid, they can be added in amounts of 3 to 20% during the swelling and dissolution of the protein because they are stable both in the alkaline and acid pH ranges. Solid or high molecular weight additional substances are preferably previously dissolved in a little water or in a polyalcohol and this solution added immediately to the protein or after it has been dissolved. Slight heating and mechanical manipulation of the dissolving protein promotes the complete dissolution, and a subsequent heating for several hours at 30° to 100° C. increases the stability of the solutions.

If it is desired to prepare colored or uncolored foils or pressed articles from the protein, only a little water is used and more of the additional substance is added, as for example 10 to 30% of a mixture of formamide and caprylic acid lactam. The mixture obtained can be rolled out to foils or used for pressed articles. Some of the additional substances also have the property of weakening the action of added tanning agents, as for example of aldehydes or chromium or aluminium compounds. Moreover most of these substances are compatible with dispersions of rubber and plastics and with polymers, which are often mixed with the proteins for modifying their properties, as for example to make them more elastic or more extensible. Combinations with thermoplastic substances yield highly glossy films which are stable to temperature.

The following examples will further illustrate this invention but the invention is not restricted to these examples. The parts are parts by weight.

*Example 1*

140 parts of casein are allowed to swell for several hours with 360 parts of water. After adding 25 parts of mono- or di-ethanolamine which has been diluted with 75 parts of water, the casein is dissolved by heating to 30° to 40° C. and stirring. There is then added a solution of 25 parts of formamide and 45 parts of ω-caprolactam or a salt of equi-molar amounts of adipic acid and hexamethylene diamine in 315 parts of water and if desired 0.5 to 1% of camphor or thymol oil as well as 15 parts of 1,4-butine-2,3-diol. The solution is heated for 6 to 12 hours at 40° to 75° C. An about 20% solution of a low-viscosity protein is obtained with a viscosity of only 115 seconds (measured in a Ford beaker of 4 mm. at 20° C.). The solution gives almost transparent, very tough films and threads of great strength and high softening point. By hardening with formaldehyde or chromium salts in the usual manner they become quite insoluble. Instead of caprolactam or of the salt of adipic acid and hexamethylene diamine, 1,4-butanediol mono- or di-urethanes, for example, can also be used.

*Example 2*

100 parts of gelatin are allowed to swell for several hours in 310 parts of water and then dissolved by heating to 30° to 40° C. 65 parts of ω-caprolactam dissolved in 335 parts of water are then added and heated for about 4 hours at 60° to 90° C. while stirring. The solution is then adjusted to a pH value of 5 to 5.5 with glacial acetic acid and stirred for another hour.

A low-viscosity, slightly acid protein condensation product is obtained which gives almost clear, hardenable films of great strength. By adding polyfunctional saturated or unsaturated alcohols, the films or threads may be made softer. Similar products are obtained with other protein solutions, as for example zein, soya bean, peanut protein or casein solutions.

*Example 3*

A solution of 15 parts of gelatin or hide glue in 40 parts of water is adjusted to a pH value of 5.5 with a small amount of carboxylic acid, for example maleic acid, dissolved in water. There is then added a solution of 2.5 parts of formamide, 4.5 parts of the salt of adipic acid and ethylene diamine or 1,4-butanediol mono- or di-urethanes and 8 parts of butanediol or butinediol and 40 parts of water and heated while stirring for 4 to 12 hours at 60° to 85° C. After cooling, the pH value is adjusted to 6.5 to 7.0 with an amine, as for example ethanolamine or cyclohexylamine.

30 parts of the solution thus prepared and 3 parts of an alcohol of high boiling point, as for example octodecyl alcohol, or saponified castor oil are intimately kneaded with 60 to 70 parts of an inorganic pigment, as for example iron oxide red, and finely ground on rollers or in a plate grinding mill. A viscous, non-settling, stable pigment paste is obtained which yields high melting point, very tough, hardenable, brown-red films which adhere very firmly to the support. The paste is capable of being diluted with water and has good compatibility with plastic dispersions or copolymer solutions, as for example, polyacrylic or polyvinyl compounds. It can be brightened with water-soluble dyestuffs, in particular basic dyestuffs.

The films can be oversprayed with protein tanning or precipitating agents, as for example formaldehyde, or solutions thereof and thereby hardened. Since the protein preparation reacts only slowly with the dissolved tanning agents, the latter can be incorporated into the dyestuff paste before it is applied. The hardening takes place uniformly within the whole film. It is therefore extremely waterproof.

*Example 4*

210 parts of casein are allowed to swell for several hours with a solution of 90 parts of ω-caprolactam, 3.6 parts of diethanolamine, 2.5 parts of soft soap, 1 part of wax soap and 2 parts of a hydroxyethylated castor oil in 700 parts of water and the swollen mass dissolved by heating at about 40° to 60° C. The mixture is condensed by subsequent heating for several hours at this temperature. 75 parts of the resultant solution are kneaded with 25 parts of carbon black or an organic pigment. A viscous mass is obtained which is rolled out to a film on a three roll mill while evaporating the water. This film is finally dried and finely ground. A fine, stable dyestuff powder is obtained which is readily dispersable in water and which can be converted by the addition of liquid binding agents, as for example protein solutions of the type described herein, and if desired a hardener, such as formaldehyde, into a readily brushable or sprayable color, and worked up.

The pigmented colors are compatible and miscible with solutions and dispersions of plastics and also with dispersions of natural and synthetic rubber derivatives. These mixtures can also be additionally colored or brightened with water-soluble dyestuffs.

*Example 5*

10 parts of an acid phthalocyanine dyestuff are dissolved in 100 parts of boiling water. 100 parts of the binding agent described in Example 1 and also 60 parts of a 35% color paste of phthalocyanine blue are added to 100 parts of the said solution. 7 parts of a water-soluble copolymer of ethyl and butyl acrylates and 25 parts of 30% formaldehyde are added to this mixture. The whole is made up to 500 parts of solution ready for use by the addition of water. Coatings and films prepared with the solution are very fast and brilliant and extremely adherent and waterproof.

*Example 6*

15 parts of casein, 2.2 parts of diethanolamine, 6.5 parts of ω-caprolactam or ω-caprylic acid lactam and 3 parts of ethanolamine soap of castor oil are dissolved in 85 parts of water at 35° to 70° C. After the solution has been stirred for several hours, it is kneaded with 250 parts of iron oxide pigment. The resultant dyestuff paste is finely ground in a roller mill. It is diluted with water for use. The films prepared with this brown dispersion are very elastic and high melting. They may be tanned with tanning agents, as for example with formaldehyde or chromium salts, whereby they become water-insoluble.

In this way it is possible to prepare pigmented films and threads of proteins, i.e. films and threads dyed in the mass, whereby less pigment, more finely dispersed, is used.

The great advantage of these colored protein products prepared according to this invention lies in the excellent properties of the polymeric natural proteins which have been plasticized and further condensed by the additions which are compatible with proteins.

They have practically unlimited stability and are of constant viscosity and good solubility.

By reason of the very slight initial reactivity with tanning substances, the so-called hardening agents can be added directly to the dyestuff solution, so that after evaporating the aqueous solvent, if desired at elevated temperature, a complete hardening through-out the material proceeds from the interior and colored films and threads are obtained which are extremely fast to moisture, of great strength and stability to temperature.

By reason of the improved solubility and greatly reduced viscosity, pigments can be worked in more easily and the improved colored products can be combined more reliably and with a greater breadth of variation with other water-soluble or dispersible binding agents and plastics, so that new valuable products can be prepared therewith. The dyestuff pastes combined with thermoplastic substances have in the form of films a higher gloss, an increased temperature stability and are fast to ironing, for example up to 200° C.

The preparations according to this invention can be used as lacquers, varnishes, pigment finishes for leather, as print pastes, as a means for the impregnation of natural and synthetic fibrous materials, such as leather, wood and paper, as films and fibers, and as materials for making pressed articles.

I claim:

1. A proteinaceous composition with improved binding power of the protein comprising (I) a protein and (II) a water-soluble compound capable of forming a synthetic linear film-forming polyamide, the proportion of (I) to (II) being 10 to 2–8 parts by weight.

2. An aqueous proteinaceous preparation with improved binding power of the protein comprising (I) a from water-swellable to water-soluble protein and (II) a water-soluble compound capable of forming a synthetic linear film-forming polyamide, the proportion of (I) to (II) being 10 to 2–8 parts by weight; and a dispersion of a thermoplastic resin selected from the group consisting of a polyacrylic and polyvinyl compound.

3. An aqueous proteinaceous preparation with improved binding power of the protein comprising (I) a from water-swellable to water-soluble protein and (II) a water-soluble compound capable of forming a synthetic linear film-forming polyamide, the proportion of (I) to (II) being 10 to 2–8 parts by weight; and a water-soluble polyhydric alcohol.

4. An aqueous proteinaceous preparation with improved binding power of the protein comprising (I) a from water-swellable to water-soluble protein and (II) a water-soluble compound capable of forming a synthetic linear film-forming polyamide, the proportion of (I) to (II) being 10 to 2–8 parts by weight; a dispersion of a thermoplastic resin selected from the group consisting of a polyacrylic and polyvinyl compound; and a water soluble polyhydric alcohol.

5. An aqueous proteinaceous preparation with improved binding power of the protein comprising (I) a from water-swellable to water-soluble protein and (II) caprolactam, the proportion of (I) to (II) being 10 to 2–8 parts by weight; and a dispersion of a thermoplastic resin selected from the group consisting of a polyacrylic and polyvinyl compound.

6. An aqueous proteinaceous preparation with improved binding power of the protein comprising (I) a from water-swellable to water-soluble protein and (II) caprolactam, the proportion of (I) to (II) being 10 to 2–8 parts by weight; and a water-soluble polyhydric alcohol.

7. An aqueous proteinaceous preparation with improved binding power of the protein comprising (I) a from water-swellable to water-soluble protein and (II) caprolactam, the proportion of (I) to (II) being 10 to 2–8 parts by weight; a dispersion of a thermoplastic resin selected from the group consisting of a polyacrylic and polyvinyl compound; and a water-soluble polyhydric alcohol.

8. An aqueous proteinaceous preparation according to claim 1 comprising between 3% to 40% of the protein and between 2% to 30% of the compound capable of forming a polyamide, the content of the protein and of the polyamide forming compound being referred to the total weight of the preparation.

9. An aqueous proteinaceous preparation according to claim 1 containing besides the polyamide forming compound from 0.5% to 20% of formamide, the formamide being present in amounts of a maximum of 5 parts by weight to 10 parts by weight of the protein.

10. A process for the production of stable aqueous proteinaceous preparations with improved binding power, which comprises heating 2 to 15 hours to about 30° to 90° C. an aqueous preparation containing a from water-swellable to water-soluble protein and with references to 10 parts by weight of the protein 2 to 8 parts by weight a substance capable of forming a synthetic linear film-forming polyamide.

11. A process for the production of stable aqueous proteinaceous preparations with improved binding power, which comprises heating 3 to 15 hours to about 30° to 90° C. an aqueous preparation containing a from water-swellable to water-soluble protein and with reference to 10 parts by weight of the protein 2 to 8 parts by weight a polyamide forming substance selected from the group consisting of a lactam, and $\alpha,\omega$-aminocarboxylic acid, a salt of a dicarboxylic acid and a diamine, and a mixture of a dicarboxylic acid and a diamine and a dispersion of a synthetic thermoplastic polymer.

12. An aqueous proteinaceous preparation with improved binding power of the protein comprising (I) a from water-swellable to water-soluble protein and (II) a water-soluble compound capable of forming a synthetic linear film-forming polyamide, the proportion of (I) to (II) being 10 to 2–8 parts by weight and a tinctorial substance.

13. An aqueous proteinaceous preparation with improved binding power of the protein comprising (I) a from water-swellable to water-soluble protein and (II) a water-soluble compound capable of forming a synthetic linear film-forming polyamide, the proportion of (I) to (II) being 10 to 2–8 parts by weight and a tinctorial substance selected from the group consisting of an inorganic pigment, an organic pigment and a water-soluble dyestuff.

References Cited in the file of this patent

UNITED STATES PATENTS

| | | |
|---|---|---|
| 2,225,604 | Lubs et al. | Dec. 17, 1940 |
| 2,341,759 | Catlin | Feb. 15, 1944 |
| 2,345,533 | Graves | Mar. 28, 1944 |
| 2,347,494 | Meigs | Apr. 25, 1944 |
| 2,415,719 | Abramson | Feb. 11, 1947 |

FOREIGN PATENTS

| | | |
|---|---|---|
| 454,611 | Great Britain | Oct. 5, 1936 |

OTHER REFERENCES

Hackh's Chemical Dictionary, 3rd edition, 1944; page 659.

UNITED STATES PATENT OFFICE
CERTIFICATE OF CORRECTION

Patent No. 2,913,347                               November 17, 1959

Theodor Wilhelm Pfirrmann

It is hereby certified that error appears in the printed specification of the above numbered patent requiring correction and that the said Letters Patent should read as corrected below.

Column 2, line 18, after "atom" strike out "or".

Signed and sealed this 21st day of June 1960.

(SEAL)
Attest:

KARL H. AXLINE                                  ROBERT C. WATSON
Attesting Officer                               Commissioner of Patents